United States Patent
Wallace et al.

(10) Patent No.: US 11,300,505 B2
(45) Date of Patent: Apr. 12, 2022

(54) TERAHERTZ-BASED CONVEYOR BELT MONITORING

(71) Applicant: ContiTech Transportbandsysteme GmbH, Hannover (DE)

(72) Inventors: Jack Bruce Wallace, Powell, OH (US); Thavashen Padayachee, Asherville (ZA); Michael John Alport, Salt Rock (ZA)

(73) Assignee: ContiTech Transportbandsysteme GmbH, Hannover (DE)

(*) Notice: Subject to any disclaimer, the term of this patent is extended or adjusted under 35 U.S.C. 154(b) by 4 days.

(21) Appl. No.: 15/930,466

(22) Filed: May 13, 2020

(65) Prior Publication Data

US 2021/0356394 A1    Nov. 18, 2021

(51) Int. Cl.
| | |
|---|---|
| *G01N 21/55* | (2014.01) |
| *G01N 22/02* | (2006.01) |
| *G01N 21/89* | (2006.01) |
| *G01B 11/22* | (2006.01) |
| *G01B 11/06* | (2006.01) |
| *G01N 21/892* | (2006.01) |

(52) U.S. Cl.
CPC ............. *G01N 21/55* (2013.01); *G01B 11/06* (2013.01); *G01B 11/22* (2013.01); *G01N 21/892* (2013.01); *G01N 22/02* (2013.01)

(58) Field of Classification Search
CPC ........ G01B 11/16; G01B 11/22; G01N 21/55; G01N 21/892; G01N 22/02
See application file for complete search history.

(56) References Cited

U.S. PATENT DOCUMENTS

| | | |
|---|---|---|
| 7,894,934 B2 | 2/2011 | Wallace et al. |
| 9,702,853 B2 | 7/2017 | Wallace et al. |
| 2004/0262132 A1 | 12/2004 | Pauley et al. |
| 2018/0274904 A1 | 9/2018 | Miura et al. |

FOREIGN PATENT DOCUMENTS

| | | | |
|---|---|---|---|
| CN | 109142268 A | * | 1/2019 |
| EP | 3599190 A1 | | 1/2020 |

OTHER PUBLICATIONS

EP Search Report dated Sep. 21, 2021 of EP application 21173712.7 claiming priority this application.

* cited by examiner

*Primary Examiner* — Mark R Gaworecki
(74) *Attorney, Agent, or Firm* — Gregory Adams; David L. Cate

(57) ABSTRACT

A system for monitoring conveyor belts is disclosed. The system also includes a transmitter, a receiver and circuitry. The transmitter is configured to direct terahertz radiation towards a conveyor belt. The receiver is configured to measure reflected radiation based on the terahertz radiation. The circuitry is configured to determine belt characteristics of the conveyor belt based on the measured reflected radiation.

20 Claims, 10 Drawing Sheets

TERAHERTZ-BASED CONVEYOR BELT MONITORING

FIELD

The field to which the disclosure generally relates is rubber products, such as conveyor belts, exposed to harsh conditions, and in particular using sensors for scanning and/or monitoring damages/defects/tears in fabric- or textile-containing rubber products.

BACKGROUND

Conveyor belts can be subjected to harsh conditions. As a result, the belts can degrade and/or fail due to tears and the like.

What is needed are techniques to scan and/or monitor conveyor belts and identify or detect belt degradation prior to belt failure. Furthermore, techniques are needed that monitor conveyor belts safely.

DETAILED DESCRIPTION

Figures 1, 2:
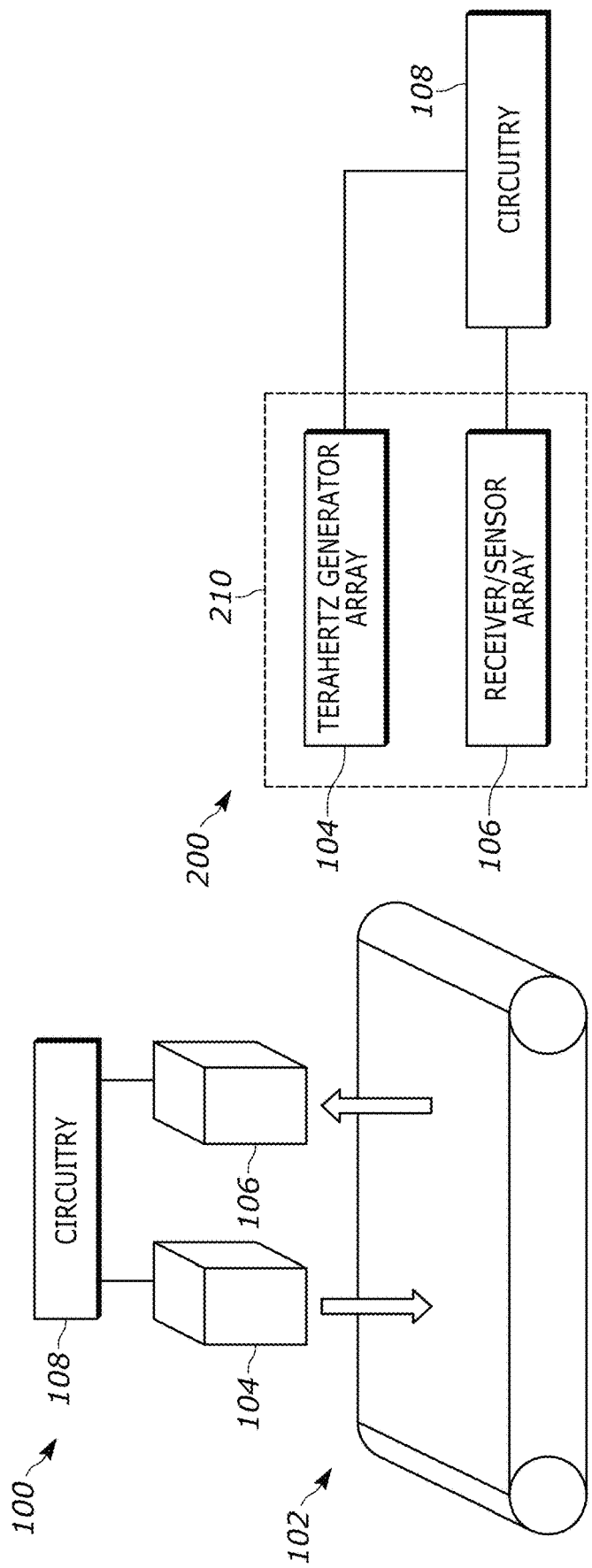
FIG. 1 is a diagram illustrating a system 100 for scanning a conveyor belt utilizing terahertz radiation and reflective measurements in accordance with one or more embodiments.
FIG. 2 is a diagram illustrating a hybrid system 200 for scanning a conveyor belt in accordance with one or more embodiments.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one, and the singular also includes the plural unless otherwise stated.

The terminology and phraseology used herein is for descriptive purposes and should not be construed as limiting in scope. Language such as "including", "comprising", "having", "containing", or "involving", and variations thereof, is intended to be broad and encompass the subject matter listed thereafter, equivalents, and additional subject matter not recited.

Also, as used herein, any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

It is appreciated that conveyor belt monitoring using various sensor technologies is possible. However, there are a range of potential safety, reliability, dimensional, cost and the like issues that can prevent or mitigate the use of sensor-based belt monitoring.

Embodiments according to the disclosure include condition monitoring of fabric- or textile-reinforced or containing rubber products, PVC, polymer coated constructions and the like, which are used in harsh applications and are subject to damage events. If these damage events are critical in nature or become progressively worse, the rubber product could suffer from a catastrophic event, by either developing a longitudinal rip or a transverse tear. This may lead to shut down operations or even lead to lengthy downtime issues as the damaged rubber product is repaired or replaced, and/or the system cleaned and repaired in order to resume operation. Furthermore, if damages in fabric- or textile-reinforced rubber products become severe, then the integrity of the load-carrying medium can be compromised and ultimately leads to complete failure if timely maintenance is not scheduled. These damages could either be in the rubber itself, or if severe enough, also in the fabric- or textile-reinforcement as well.

Additionally, it is appreciated that conveyor belt damage and/or degradation is important to mining conveyor belt systems. The embodiments can provide the ability to detect and react to sources of belt degradation, and the embodiments can extend the life of the belt and enhance operation of mining conveyor belt systems. Further, knowledge of the conveyor belt condition or degradation permits mines or mining operations to plan/schedule belt replacements at selected times that facilitate productivity and efficiency of the mining process. For example, known degradation can permit a system to schedule replacement during low volume or downtimes of a conveyor belt system. Further, the embodiments can provide determination of belt structure and defect characterization using reflective time-of-flight measurements. The embodiments can, for example, determine cover gauges, detect carcass delamination, identify damage events caused by impact or conveyor accessory (such as scraper, wiper, or skirtboard) or structural interactions (such as side travel of belt into structure or scraping on transverse structural elements).

In some aspects, scanning or monitoring conveyor belts to detect, monitor and alarm when hazardous conditions arise can prevent the catastrophic events described above. According to the disclosure, a sensor system detects, assesses and/or monitors changes to damage events and their risk to the integrity of the conveyor belt via either periodic scans or permanently-mounted conveyor scans. Also, by expanding the system to monitor for splice integrity and longitudinal rips in the permanently-mounted systems, the sensor system could further limit damage to the conveyor belt and system by detecting changes in the splice that could lead to a splice failure, prior to the failure, allowing for preventative actions to be taken, and by limiting longitudinal rips in the system due to damage to dielectric elements that are embedded at regular intervals over the length of the conveyor belt. In one example, a tear is in a transverse direction and a rip is in a longitudinal direction.

It is appreciated that one type of scanning or imaging uses terahertz radiation. The terahertz radiation generally involves frequencies between microwave and infrared, such as 300 billion hertz to 3 trillion hertz. It is appreciated that this terahertz radiation can be used to non-destructively penetrate and image conveyor belts and the like. Thus, two- and three-dimensional maps can be generated for conveyor belts using this technique.

FIG. 1 is a diagram illustrating a system 100 for scanning a conveyor belt utilizing terahertz radiation and reflective measurements in accordance with one or more embodiments. The system 100 is provided for illustrative purposes and it is appreciated that suitable variations are contemplated.

The system 100 utilizes terahertz radiation for conveyor belt diagnostics to identify degradation and the like in a conveyor belt.

The system 100 utilizes THz technology in a reflective configuration that is applied for diagnostic non-destructive scanning or monitoring of conveyor belts containing textile or fabric. The system 100 can be configured to generate a THz image based on one revolution of the belt using the returned power from reflections from the conveyor belt surface and internal structures to highlight differences in conveyor construction, whether that be for splice monitoring, mold designs (chevrons), embedded structural components or defect morphology. Further, the system can be configured to utilize the time domain of reflections to generate depth details of the conveyor belt morphology.

The system 100 can generate a THz image map of one revolution of the belt and analyze this image for splice construction and splice defects that develop over time (between periodic scans or in a permanent system).

Further, the system 100 can generate a report of the analysis of this scan (image of one revolution) in order to alert the customer of potential high-risk damages that require 'action' to prevent a catastrophic event or to repair to extend the life of the conveyor belt.

In one example, the system 100 is installed as a permanent or fixed monitoring device. For a fixed monitoring device, the system can store a THz image map of one revolution of the belt and analyze incoming data against this image to detect longitudinal rips or new damages in the reinforcing textile layer(s). Further, the system 100 can store a THz image map of one revolution of the belt with longitudinal information of health of textile elements or other material components that are embedded between the carcass and bottom (pulley) cover surface at regular intervals, in order to detect longitudinal grooving damage or rip events in these embedded elements. Additionally, a permanent system 100 can generate an alarm that can be used to stop the conveyor belt to limit the damage to the conveyor belt.

The system 100 includes a transmitter 104 and a radiation sensor 106 that operate on a conveyor belt 102.

The conveyor belt 102 can be a composite of fabric, polymeric material and the like. The belt 102 can have one or more splices. The belt 102 can include reinforcements, such as fiber, fabric, steel cords and the like.

The conveyor belt 102 can include a polymeric top cover material, including but not limited to rubber, PVC, polyurethane and the like, a reinforcing or protective ply (plies)/layer(s) having a fabric/textile layer and a bottom-coated polymeric layer.

Some example compositions of plies/layers for the belt 102 include:

Polymer-Textile #1-Textile #2- . . . -Textile #N-Polymer Layers (where there can be 1 to N textile-reinforcing layers)

Polymer-Textile Breaker-Steel Cord-Polymer Layers

Polymer-Steel Cord-Textile Breaker-Polymer Layers

Polymer-Textile Breaker-Steel Cord-Textile Breaker-Polymer Layers

The conveyor belt 102 can further include embedded elements to serve as reference to specific locations on the belt 102. The locations include rip inserts, structure elements, edges, and the like. The embedded elements can include radio frequency identification (RFID) tags. This requires the addition of an RFID reading device to detect RFID tags in the belt. This makes it easier for the end user to locate the damage or object of interest identified by the THz scan based on the location. The system 100 can be configured to use the embedded elements to facilitate determining locations of identified defects by using corresponding locations as a reference point to the identified defects.

The transmitter 104 includes an array of transmitters/field generators configured to generate terahertz radiation and direct the radiation toward a portion of the conveyor belt 102. It is appreciated that the number of generators in the transmitter 104 can be one or more. Further, it is appreciated that individual generators can be positioned at selected locations above the belt 102.

The sensor 106 includes an array of receivers/sensors configured to measure reflected signals based on the transmitted terahertz radiation. It is appreciated that the number of generators in the receiver 106 can be one or more.

The reflected signals have a selected range of reflection from 0.01 to 0.2 THz, based on desired spatial resolution and penetration depth.

The selected frequency range of reflection can be modified/adjusted during operation. For example, the range can be adjusted to image particular layers, depths and sections of the conveyor belt 102.

The circuitry 108 is configured to generate conveyor belt characteristics based on the reflected signals. These characteristics can include a full or partial map of the conveyor belt, images, identified wear regions, splits, abrasions and the like.

The circuitry 108 can also be configured to read or detect embedded elements, such as RFID tags and the like. In one example, the circuitry 108 includes an RFID reader. The detected embedded elements have known locations on the belt 102 and can be used to facilitate location of identified defects.

The circuitry 108 can also be configured to identify alarm conditions and generate/trigger alarm notifications. The circuitry 108 can determine, for example, that the thickness of a layer has reduced below a threshold value, trigger an alarm and generate a notification identifying the defect, the location of the defect and the like. The circuitry 108 can determine, as another example, that a splice interface has degraded, trigger an alarm and generating a notification identifying the splice defect, the location of the splice defect and the like.

FIG. 2 is a diagram illustrating a system 200 for scanning a conveyor belt in accordance with one or more embodiments. The system 200 is provided for illustrative purposes and it is appreciated that suitable variations are contemplated.

The system 200 is substantially similar to the system 100 and includes additional details about circuitry 108.

The system 200 includes the circuitry 108, a transmitter 104 and a receiver 106. The transmitter 104 and the receiver 106 can be collectively referred to as a terahertz-based sensor array 210.

The circuitry 108 is configured to cause the transmitter 104 to generate terahertz radiation in the form of fields and/or signals. The circuitry 108 is also configured to cause the receiver 106 to measure reflected signals based on the generated terahertz radiation. The circuitry 108 is configured to generate the belt characteristics of a conveyor belt, such as the belt 102.

Figure 3:
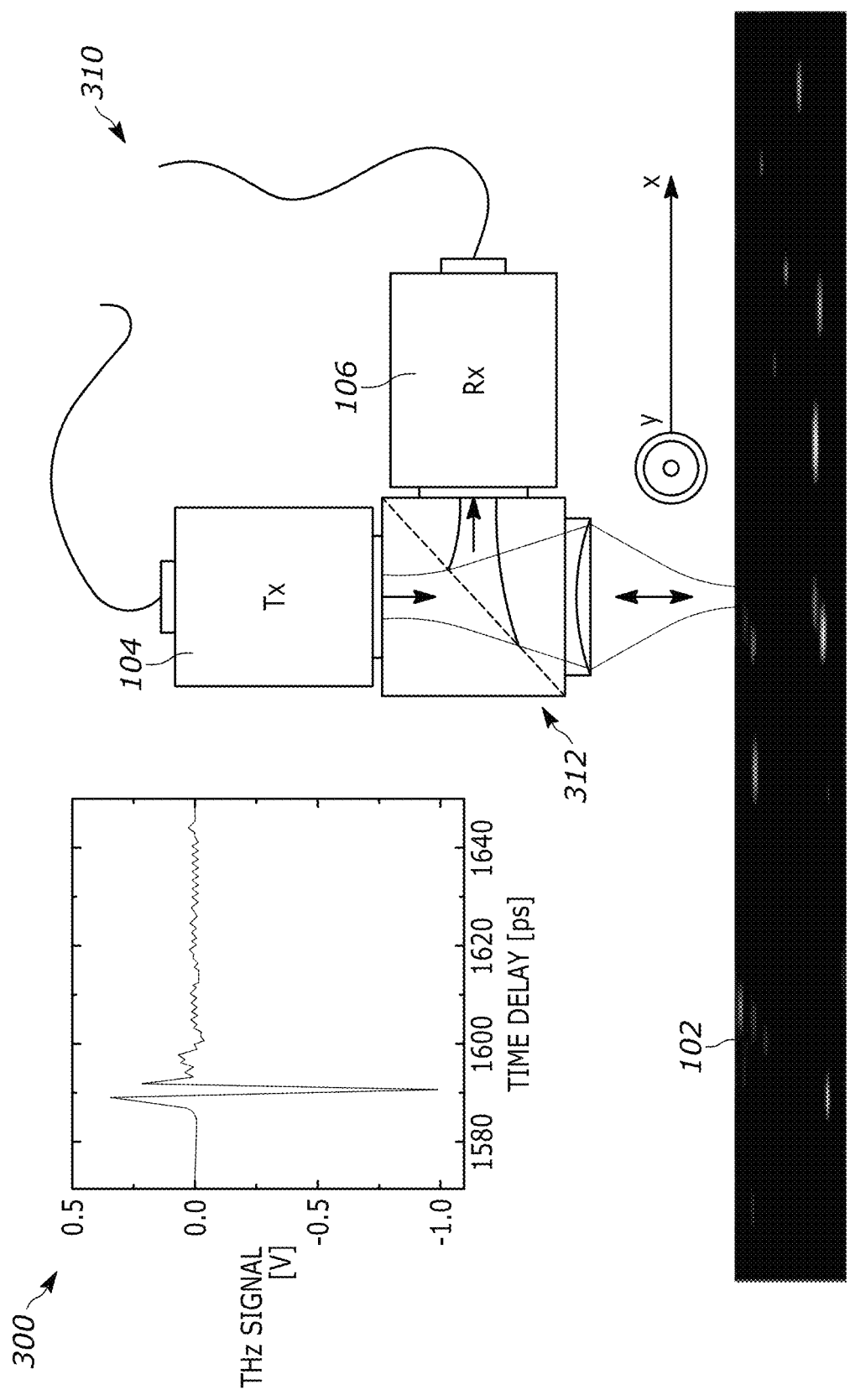
FIG. 3 is a diagram illustrating an arrangement 300 of a terahertz sensor array 310 in accordance with one or more embodiments.

FIG. 3 is a diagram illustrating an arrangement 300 of a terahertz sensor array 310 in accordance with one or more embodiments.

The sensor array 310 includes a transmitter 104 and a receiver 106. The sensor array 310 can be positioned and/or repositioned about/over the conveyor belt 102.

In this example, the transmitter 104 generates radiation towards the belt 102 and the receiver 106 receives and measures reflected signals via reflection element 312.

Figure 4:
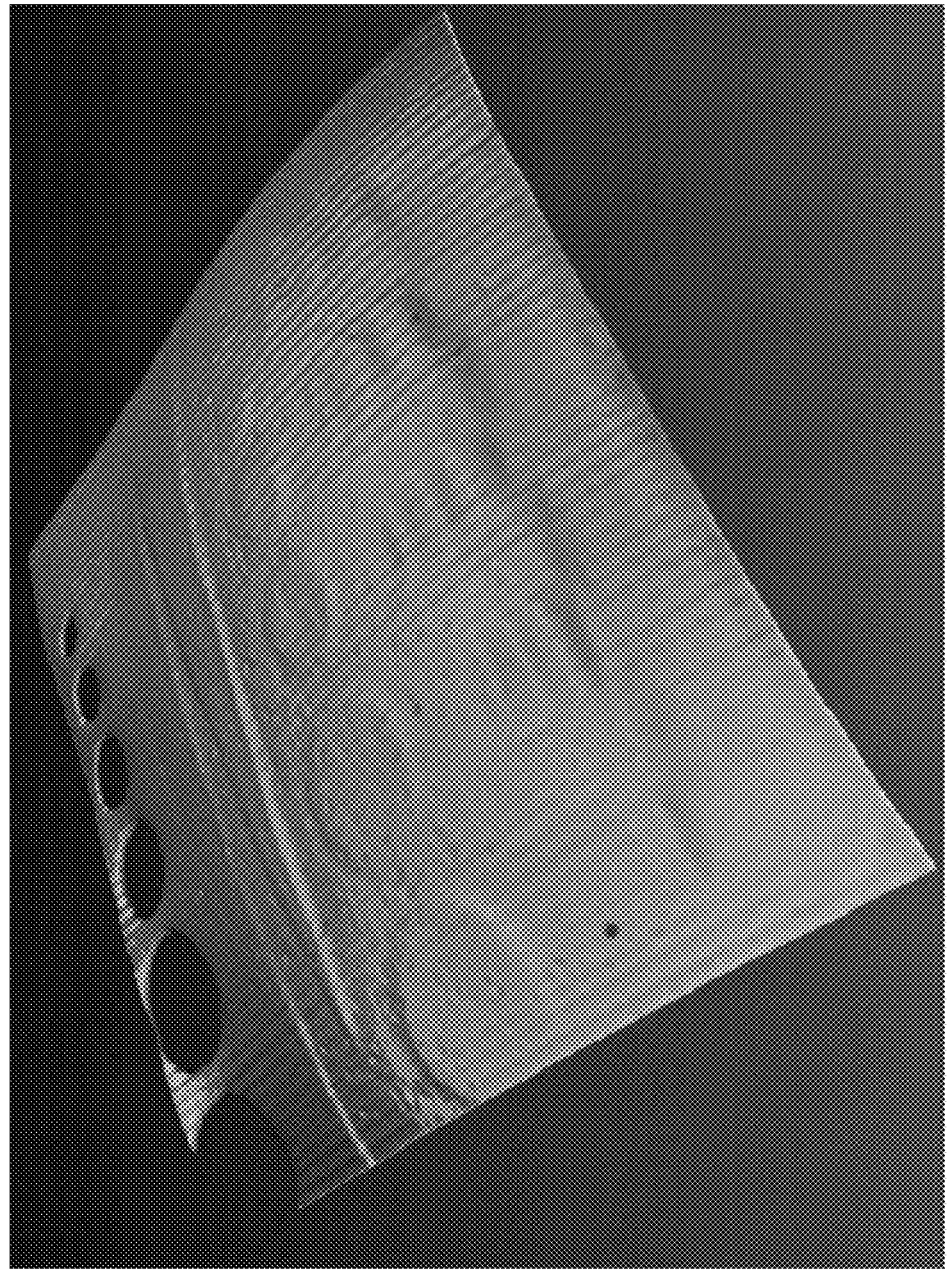
FIG. 4 is a graph 400 of conveyor belt measurements based on the terahertz sensor array 310 in accordance with one or more embodiments.

FIG. 4 is a graph 400 of conveyor belt measurements based on the terahertz sensor array 310 in accordance with one or more embodiments.

The graph 400 is a morphological surface plot where the received intensity (measured reflected signals) is converted to a height.

Figure 5:
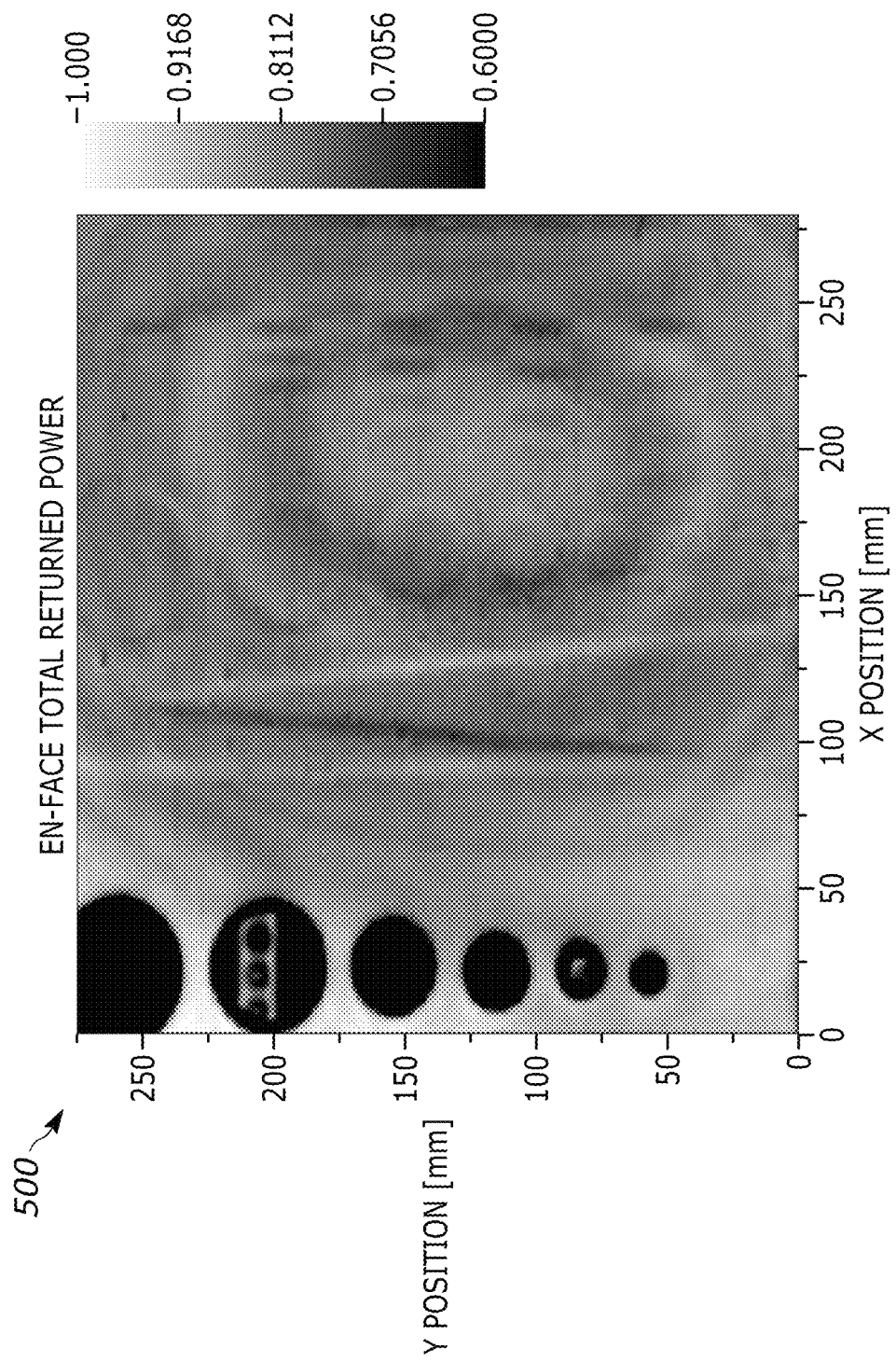
FIG. 5 is another graph 500 of conveyor belt measurements based on the terahertz sensor array 310 in accordance with one or more embodiments.

FIG. 5 is another graph 500 of conveyor belt measurements based on the terahertz sensor array 310 in accordance with one or more embodiments.

The graph 500 is a greyscale plot showing X-position and Y-position (two dimensions) and returned power based on the reflected signals.

Figure 6:
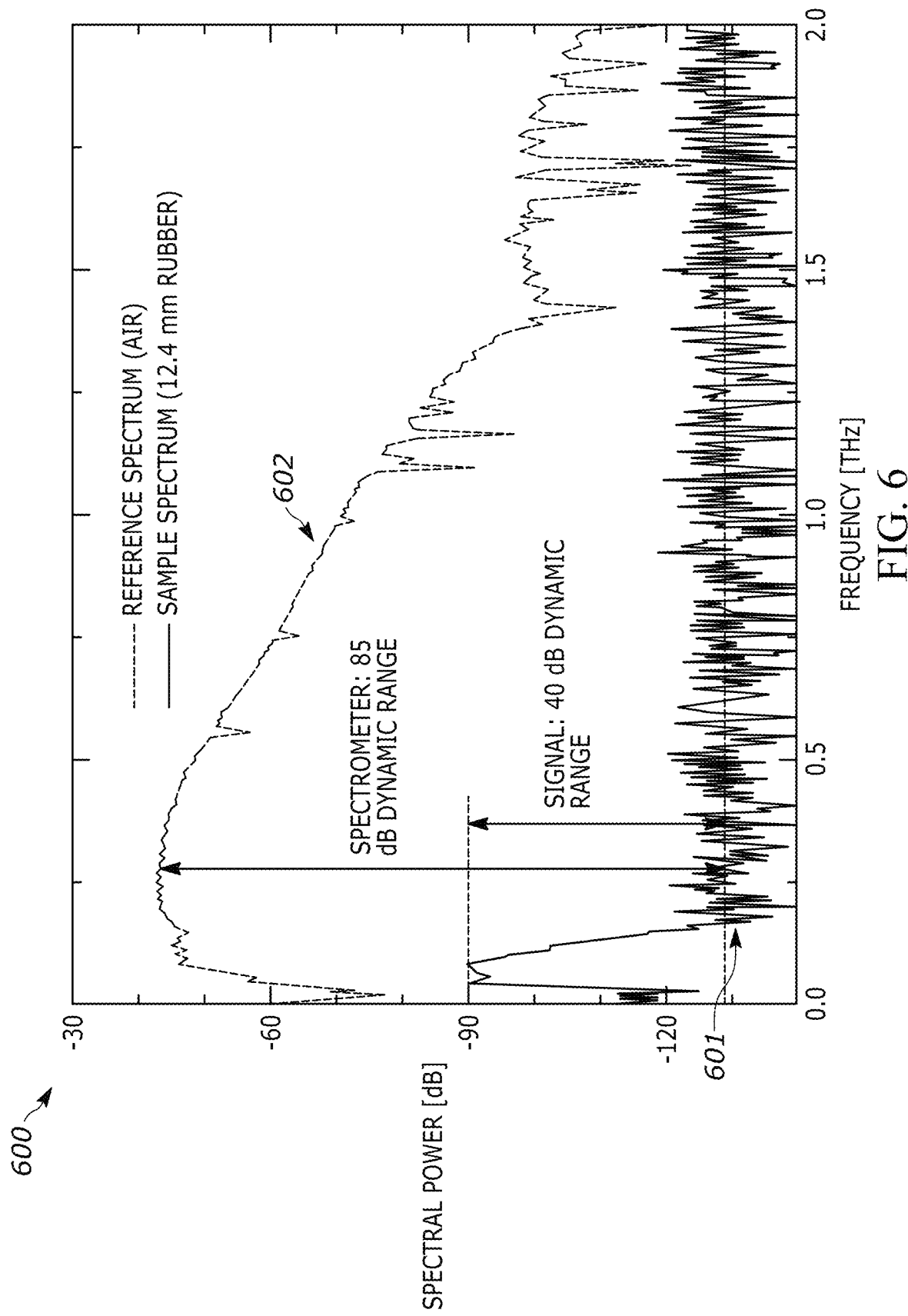
FIG. 6 is a graph 600 illustrating a sample spectrum versus a reference spectrum for a range of terahertz frequencies in accordance with one or more embodiments.

FIG. 6 is a graph 600 illustrating a sample spectrum versus a reference spectrum for a range of frequencies in accordance with one or more embodiments.

The horizontal axis is frequency in terahertz (THz). The vertical axis is spectral power in decibels (dB).

Line 602 is a reference spectrum based on measurements of air.

Line 601 is a sample spectrum based on measurements of a conveyor belt, such as the belt 102.

Figure 7:
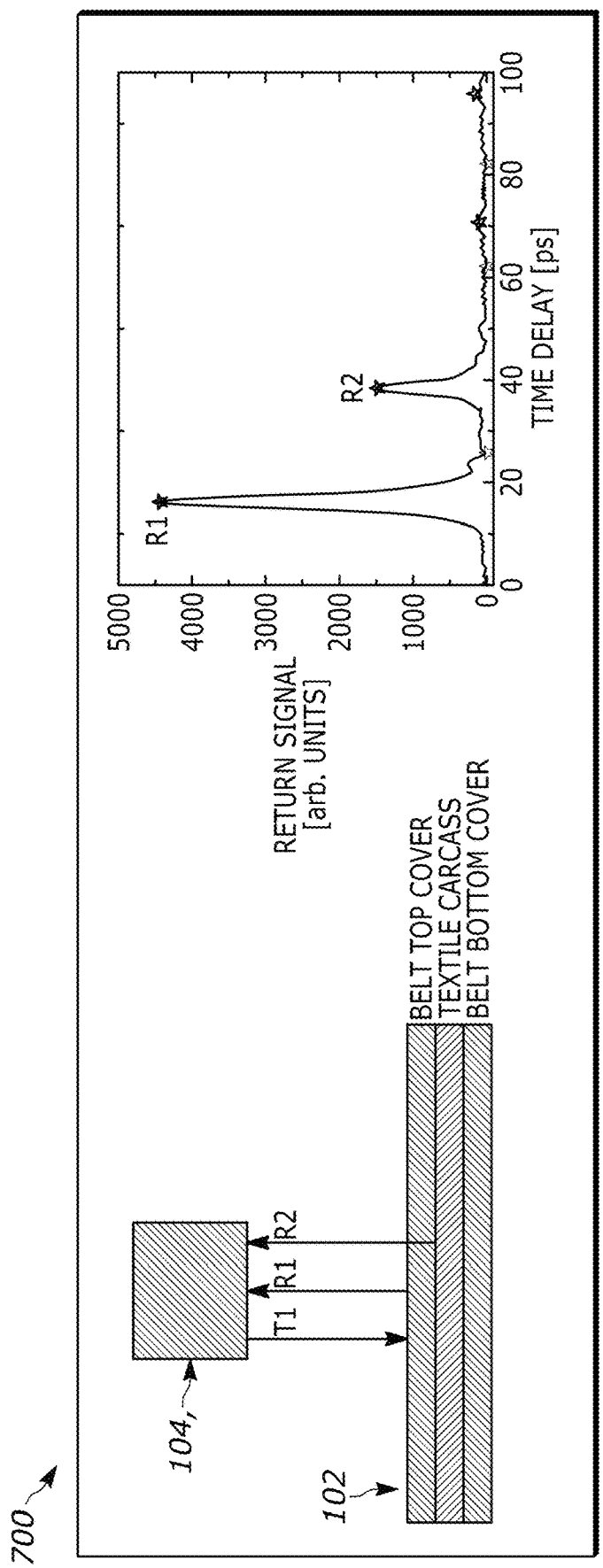
FIG. 7 is a diagram illustrating a terahertz sensor array and an example return signal in accordance with one or more embodiments.

FIG. 7 is a diagram illustrating a terahertz sensor array and an example return signal in accordance with one or more embodiments. The array can be used with the systems and embodiments described above.

This example 700 is provided for illustrative purposes and it is appreciated that suitable variations are contemplated.

The sensor array includes the transmitter 104 and receiver 106, which generally operate as described above.

The transmitter 104 generates radiation toward the belt 102. The radiation or signal is labeled T1.

Reflective or return signals, R1 and R2, come from the belt 102 and various depths, as shown. R1 is a signal reflected by an upper interface or surface of a first layer or cover. R2 is a signal reflected by a lower inner interface or surface, below the first layer or cover interface. It is appreciated that other reflected signals can be generated by other inner layer interfaces and surfaces.

It is appreciated that an example of a suitable range for transmission is from 0.01 to 0.2 THz due to or based on absorption properties of rubber materials/products. The reflected signal is still subjected to this attenuation effect; thus, a suitable frequency would/should allow maximum or increased transmission while also providing a useful spatial resolution. Hence, the range from 0.04 to 0.08 THz provides both transmission and spatial resolution that is suitable for the detection of belt defects, damages and structures that could impact conveyor performance.

THz reflection imaging is employed as a suitable technique for depth and damage/defect detection. A high index of refraction is advantageous for reflection imaging, as the reflection coefficient, $r=(1-n)/(1+n)$, is high for high-index materials. Specifically, for the index of refraction of a typical fabric belt, the reflection coefficient is approximately 55%.

FIG. 7 depicts the transmitter 104 and receiver 106 as being at about a 90-degree angle for illustrative purposes. It is appreciated that other suitable geometries are contemplated and may facilitate the condition of reflection and defect identification.

It is appreciated that it is important to balance the amount of signal penetrating the belt 102 and the amount of signal reflected by the belt 102. Thus, it is also appreciated that absorption properties of material and layers of the belt 102 are considered in selecting frequencies for the transmitter-generated radiation.

For example, at 0.1 THz, the attenuation coefficient is 8 $cm^{-1}$. This indicates that the power transmitted through a 20 mm belt would be attenuated by 70 dB. At 50 GHz, the attenuation would still be 48 to 50 dB.

The same absorption would apply to the reflected signal; thus, the lower side of the above limit is suitable for this material; thus a 0.04 to 0.08 THz range for the transmitter radiation is suitable.

Separation from signals can provide depth information and indicate defects and the like detected in the structure. Thus, if a first reflection signal is from a top surface, a second reflection is from a lower inner interface, a third reflection signal is from an even lower inner interface and additional reflection signals can occur. Knowledge about the conveyor construction (carry "top" and pulley "bottom" cover gauges, number of fabric plies, splice design are some examples of analysis inputs), allows for these reflections to be analyzed and interpreted.

Power integration data provides the amount of power being returned by the different sections of belt as a whole, and thus provides important morphology or structural information about the belt construction and how it may change at different positions, allowing one to identify potential defects by only using the total returned power from a given location on the belt.

This morphology data can be used to measure characteristics utilized in the manufacture of belt splices where fabrics are cut at specific angles and patterns in order to fabricate a quality splice between the sections of belts that are joined to make a conveyor belt that can be used on a conveyor system. If these splices are of poor quality or are damaged during operation, the belt could tear transversely at this location and generate a catastrophic event that would lead to major downtime for mining operations. It is appreciated that tear can refer to a defect in a transverse direction (across a belt) and a rip in a longitudinal direction (running length).

Examples of belt splices used in fabric/textile belts, include but not limited to the designs shown in FIG. 8 through 11.

Referring again to FIG. 7, the transmitter radiation T1 and reflective signals R1 and R2 illustrate how reflective signals can be used to determine depth and identify conditions at various depths.

Thus, time between pulses can be used to calculate the thickness of a layer by using the refractive index of the material and the frequency of measurement.

This thickness can be used to determine changes in cover thickness and other layer thicknesses of conveyor belts, such as the belt 102.

It is noted that reflections between the top cover and top reinforcement layer would indicate the existence of a reflective structure between the top cover and the reinforcing layer. A later measurement may show a smaller time delay difference, t(R2)−t(R1), which would indicate a loss of material. An increase in this spacing could indicate carcass damage in the area. As such, one would expect the characteristics of a given splice, where fabric belts are spliced together using bias cuts or finger cuts, would be able to be resolved and monitored for potential changes in these splice characteristics over time.

The depth of signals and, therefore thicknesses of layers can be calculated as shown here.

$$\text{Depth, } D = \Delta t \cdot (c/n) \quad \text{(Eq 1)}$$

$\Delta t$ is the time delta between reflected peaks.

c is the speed of light in a vacuum.

n is the refractive index for rubber for a particular frequency—this quantity would be the highest contributor to measurement uncertainty.

Figure 8:
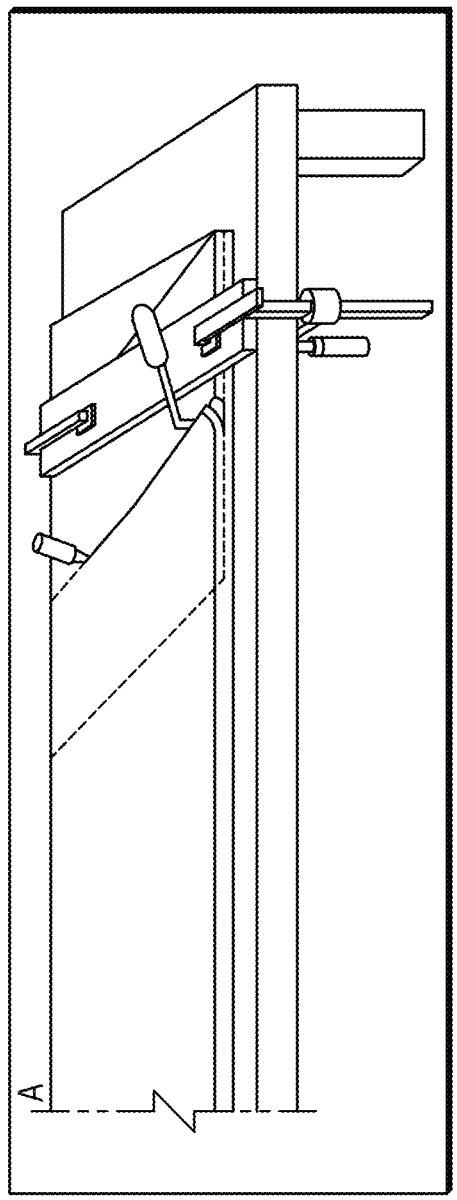
FIG. 8 is a diagram illustrating an example of a splice joint and splicing that can be detected using the system 100 and suitable variations thereof.

FIG. 8 is a diagram illustrating an example of a splice joint and splicing that can be detected using the system 100 and suitable variations thereof.

A conveyor belt, such as the belt 102, is shown having a first section on the left spliced with a second section on the right. In this example, the second section is held tight to a surface while a joining portion of the first section is attached to a joining portion of the second section. In this example, the joining portions are tiered or stepped over a plurality of layers.

Figure 9:
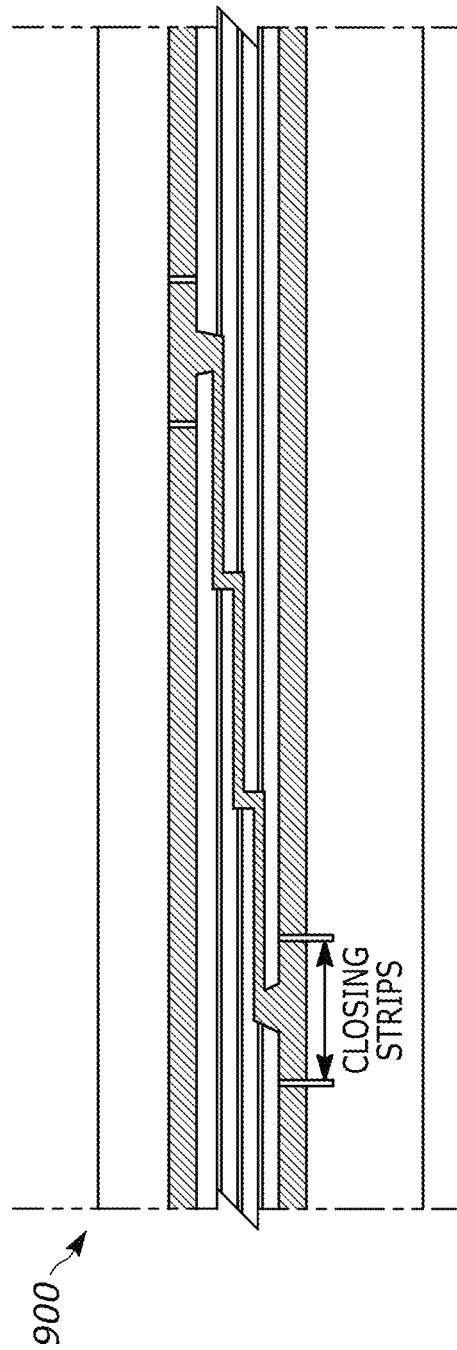
FIG. 9 is a side view illustrating the splice joint of FIG. 8 in accordance with one or more embodiments.

FIG. 9 is a side view illustrating the splice joint of FIG. 8 in accordance with one or more embodiments.

The joining portion of the first section is shown joined with the joining portion of the second section.

Figure 10:
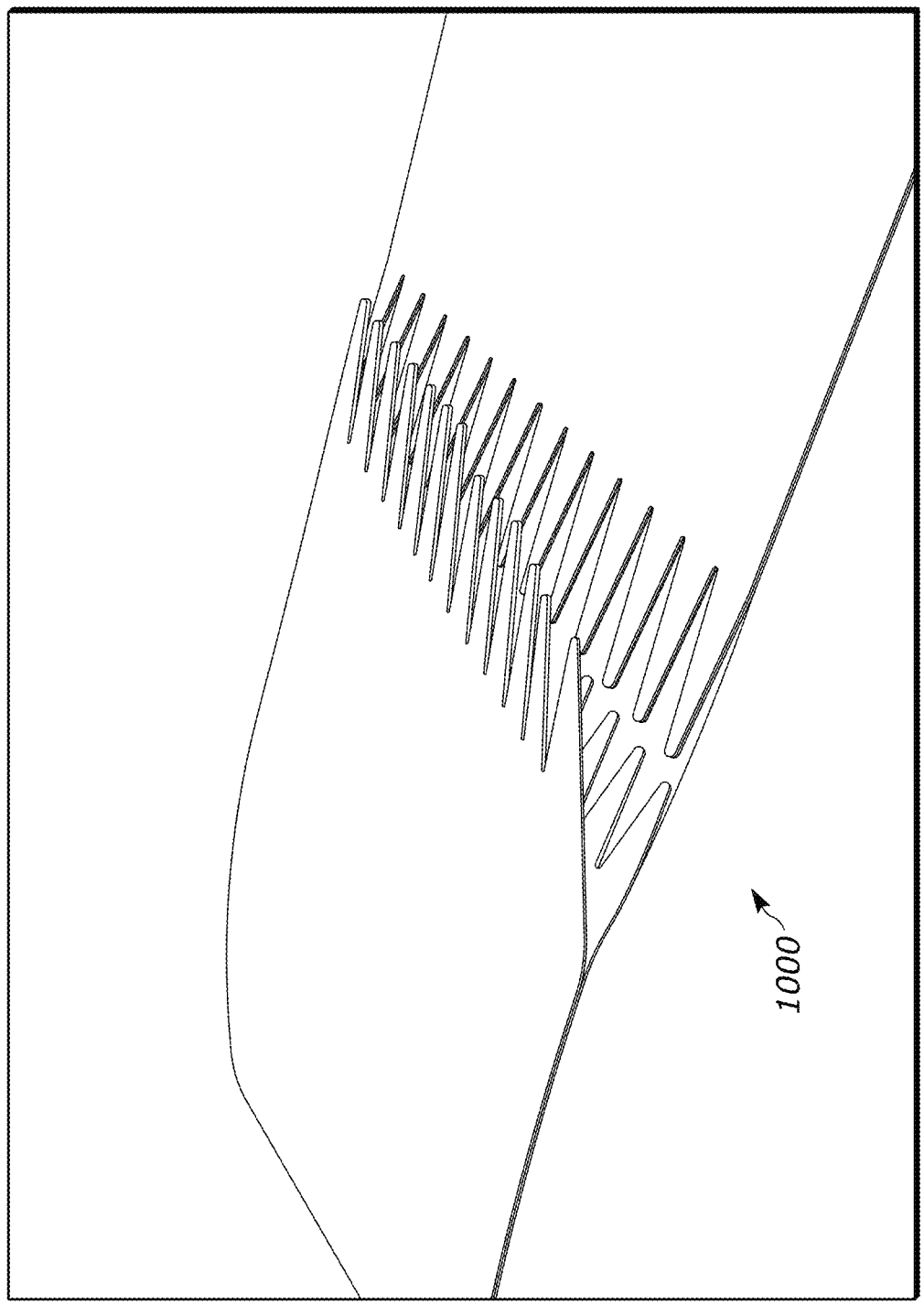
FIG. 10 is a diagram illustrating a fingers-type splice joint in accordance with one or more embodiments.

FIG. 10 is a diagram illustrating a finger-type splice joint in accordance with one or more embodiments.

A conveyor belt, such as the belt 102, is shown having a first section on the left spliced with a second section on the right. In this example, joining portions of each section have matching and interlocking fingers.

Figure 11:
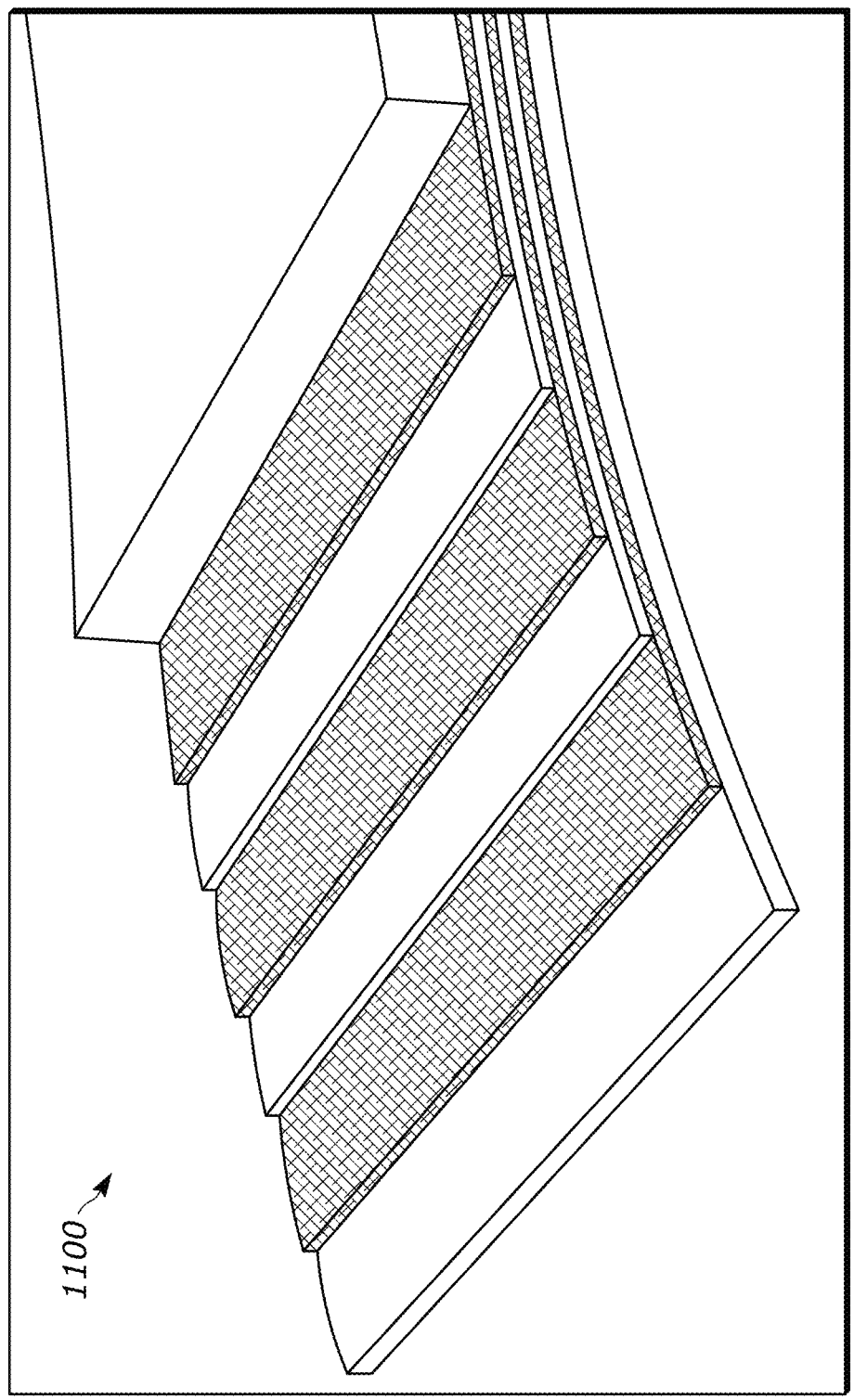
FIG. 11 is a diagram illustrating an example of a conveyor belt 1100 that can be used in accordance with one or more embodiments.

FIG. 11 is a diagram illustrating an example of a conveyor belt that can be used in accordance with one or more embodiments.

This belt can be used as the conveyor belt 102, described above.

The belt is shown with a plurality of layers. The darker-shaded layers are comprised of a polymeric material and the lighter-shaded layers are a fabric reinforcement.

The system 100 can be utilized to detect characteristics about each of the layers of the depicted conveyor belt and identify the presence of defects within each layer of the belt or splice.

Figure 12:
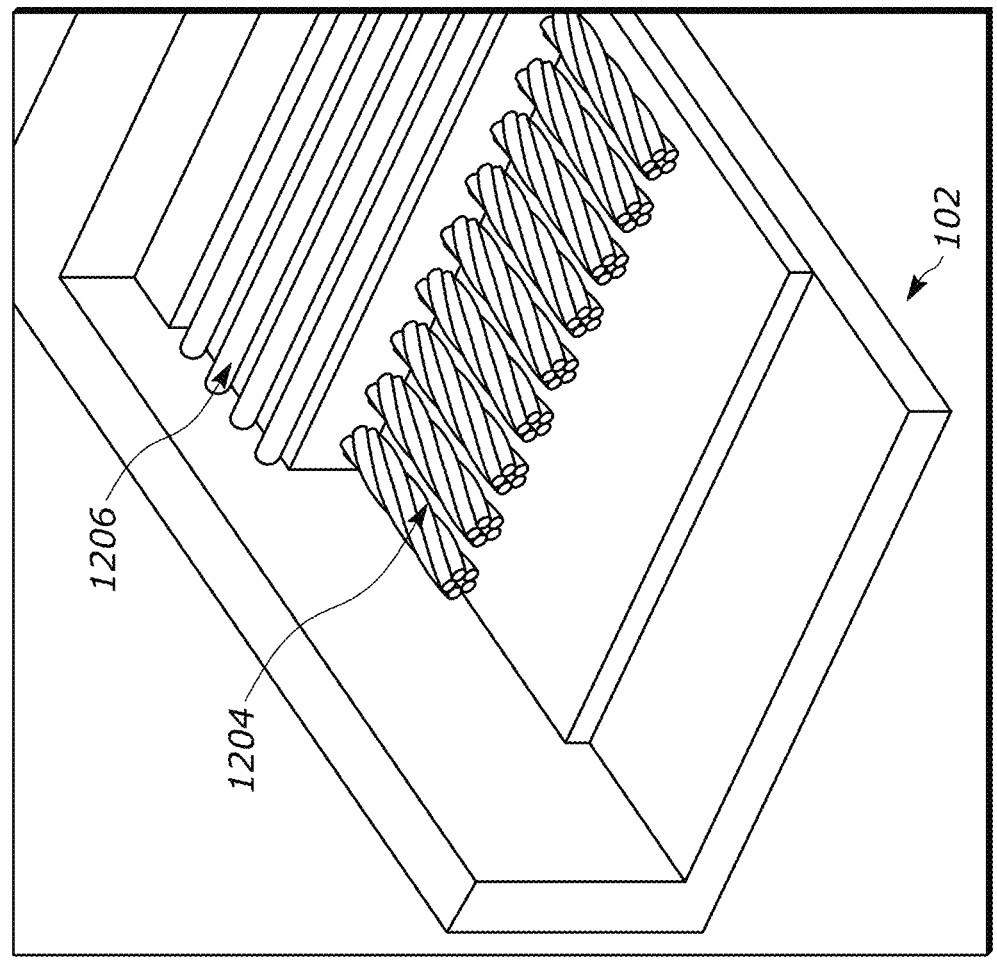
FIG. 12 is a diagram illustrating a conveyor belt 1200 having a support/reinforcing layer in accordance with one or more embodiments.

FIG. 12 is a diagram illustrating a conveyor belt 1200 having a support/reinforcing layer in accordance with one or more embodiments. The belt 1200 is provided for illustrative purposes and it is appreciated that suitable variations are contemplated.

The belt 1200 can be used as the belt 102 of the system 100 as shown above.

The belt 1200, 102 includes a steel reinforcement layer 1204 having steel cords along a length of the belt.

The belt 1200, 102 also includes a reinforcement or support layer 1206.

The system 100 and variations thereof can be configured to identify defects and/or locations for identified defects within the breaker layer 1204, the support layer 1206, used in steel cords, reinforcing cords (i.e. aramid, nylon, polyester, etc.) and the like.

In addition to that described above, some embodiments of the disclosure could be utilized in conveyor belt applications that have vertical components to monitor vertical structures such as belt walls, cleats, buckets, chevrons, and the like.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

One general aspect includes a system for monitoring conveyor belts. The system also includes a transmitter configured to direct terahertz radiation towards a conveyor belt. The system also includes a receiver configured to measure reflected signals based on the terahertz radiation. The system also includes circuitry configured to determine belt characteristics of the conveyor belt based on the measured reflected radiation.

Implementations may include one or more of the following features. The system may include a reflection element configured to reflect a portion of the terahertz radiation after a portion of the transmitted beam is reflected off the conveyor surface and subsequent internal interfaces towards the receiver. The transmitter is configured to direct the terahertz radiation normal to an outer surface of the conveyor belt. The system further where the system is permanently mounted and the circuitry generates an alarm based on the measured reflected signals from a current scan and a prior scan. The reflected radiation has a selected frequency of up to 2.0 thz. The circuitry is configured to determine a depth of a cover layer based on the measured reflected radiation. The reflected radiation includes a first reflected pulse at a first time and a second reflected pulse at a second time and the circuitry determines a depth of a layer based on the first reflected pulse and the second reflected pulse. The first reflected pulse is a reflection from an upper surface of a cover layer and the second reflected pulse is a reflection from a lower interface or surface within the conveyor belt. The circuitry is configured to determine the thickness of a cover layer based on the measured reflected radiation. The circuitry is configured to detect a defect and identify a tear in a transverse direction and/or a rip in a longitudinal direction within the conveyor belt at a depth, width and length position of the conveyor belt. The circuitry is further configured to determine a length along the conveyor belt using an encoder or other tachometer device, edges of the conveyor belt by the absences of reflected signals and a depth based on delta time of reflections. The circuitry is configured to utilize returned power of the reflected signals to determine changes in the belt morphology for the purpose of monitoring conveyor structure over time either through periodic scans. The circuitry is configured to utilize returned power of the reflected signals in order to assess and monitor a splice joint between a plurality of sections of belt in order to assess construction for quality and/or monitor over time through periodic scans or from one belt revolution to the next. The system where the transmitter and receiver have a geometry altered from both being perpendicular from the belt surface to being skewed such as to have an angle between the transmit and received signal to optimize reflective signal for defect detection. Implementations of the described techniques may include hardware, a method or process, or computer software on a computer-accessible medium.

One general aspect includes a system for monitoring conveyor belts. The system also includes a receiver configured to measure a first reflected signal and a second reflected signal based on terahertz radiation and from a conveyor belt. The system also includes circuitry configured to determine an upper surface of a layer of the conveyor belt based on the first reflected signal and a lower interface or surface layer based on the second reflected signal.

Implementations may include one or more of the following features. The system where the layer is a cover layer or top layer. The interface layer is located below a cover of the conveyor belt. Implementations of the described techniques may include hardware, a method or process, or computer software on a computer-accessible medium.

One general aspect includes a method of monitoring a conveyor belt. The method of monitoring also includes directing terahertz radiation toward a conveyor belt. The method of monitoring also includes generating reflected signals based on a refractive index and absorption characteristics of the conveyor belt. The method of monitoring also includes measuring the reflected signals by a receiver. The method of monitoring also includes determining belt characteristics based on the measured reflected signals.

Implementations may include one or more of the following features. The method may include determining belt edges, belt structure, presence of defects and splice structural characteristics based on the measured reflected signals. The method may include determining the returned power of the reflected signals to monitor one or more splice joints. Implementations of the described techniques may include hardware, a method or process, or computer software on a computer-accessible medium.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an Application Specific Integrated Circuit, a Digital Signal Processor, a Field Programmable Gate Array, a Programmable Logic Controller, a Complex Programmable Logic Device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second", and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially-relative terms, such as "inner", "adjacent", "outer", "beneath", "below", "lower", "above", "upper", and the like, may be used herein for ease of description to describe one element or feature's relationship to another element(s) or feature(s) as illustrated in the figures. Spatially-relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially-relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for monitoring conveyor belts, the system comprising:
    a transmitter configured to direct terahertz radiation towards a conveyor belt;
    a receiver configured to measure reflected signals based on the terahertz radiation; and
    circuitry configured to determine belt characteristics of the conveyor belt based on the measured reflected radiation; and
    the circuitry is configured to determine a depth of a cover layer based on the measured reflected radiation.

2. The system of claim 1, further comprising a reflection element configured to reflect a portion of the terahertz radiation after a portion of the transmitted beam is reflected off the conveyor surface and subsequent internal interfaces towards the receiver.

3. The system of claim 1, wherein the transmitter is configured to direct the terahertz radiation normal to an outer surface of the conveyor belt.

4. The system of claim 1, further where the system is permanently mounted and the circuitry generates an alarm based on the measured reflected signals from a current scan and a prior scan.

5. The system of claim 1, wherein the reflected radiation has a selected frequency of up to 2.0 THz.

6. The system of claim 1, wherein the reflected radiation includes a first reflected pulse at a first time and a second reflected pulse at a second time and the circuitry determines a depth of a layer based on the first reflected pulse and the second reflected pulse.

7. The system of claim 6, wherein the first reflected pulse is a reflection from an upper surface of a cover layer and the second reflected pulse is a reflection from a lower interface or surface within the conveyor belt.

8. The system of claim 1, wherein the circuitry is configured to determine the thickness of a cover layer based on the measured reflected radiation.

9. The system of claim 1, wherein the circuitry is configured to detect a defect and identify a tear in a transverse direction and/or a rip in a longitudinal direction within the conveyor belt at a depth, width and length position of the conveyor belt.

10. The system of claim 9, wherein the circuitry is further configured to determine a length along the conveyor belt using an encoder or other tachometer device, edges of the conveyor belt by the absences of reflected signals and a depth based on delta time of reflections.

11. The system of claim 1, wherein the circuitry is configured to utilize returned power of the reflected signals to determine changes in the belt morphology for the purpose of monitoring conveyor structure over time through periodic scans.

12. The system of claim 1 wherein the circuitry is configured to utilize returned power of the reflected signals in order to assess and monitor a splice joint between a plurality of sections of belt in order to assess construction for quality and/or monitor over time through periodic scans or from one belt revolution to the next.

13. The system of claim 1 where the transmitter and receiver have a geometry altered from both being perpendicular from the belt surface to being skewed such as to have an angle between the transmit and received signal to optimize reflective signal for defect detection.

14. A system for monitoring conveyor belts, the system comprising:
    a receiver configured to measure a first reflected signal and a second reflected signal based on terahertz radiation and from a conveyor belt; and
    circuitry configured to determine an upper surface of a layer of the conveyor belt based on the first reflected signal and a lower interface or surface layer based on the second reflected signal.

15. The system of claim 14, wherein the layer is a cover layer or top layer.

16. The system of claim 14, wherein the interface layer is located below a cover of the conveyor belt.

17. The system of claim 14, further comprising a transmitter configured to direct the terahertz radiation normal to an outer surface of the conveyor belt.

18. A method of monitoring a conveyor belt, the method comprising:
    directing terahertz radiation toward a conveyor belt;
    generating reflected signals based on a refractive index and absorption characteristics of the conveyor belt;
    measuring the reflected signals by a receiver; and
    determining belt characteristics based on the measured reflected signals.

19. The method of claim 18, further comprising determining belt edges, belt structure, presence of defects and splice structural characteristics based on the measured reflected signals.

20. The method of claim 18, further comprising determining the returned power of the reflected signals to monitor one or more splice joints.

* * * * *